(12) United States Patent
Lonstein et al.

(10) Patent No.: US 9,027,042 B2
(45) Date of Patent: May 5, 2015

(54) SYSTEMS AND METHODS FOR DETECTING IMPROPER USE OF TELECOMMUNICATIONS RECEPTION DEVICE

(71) Applicants: Wayne D Lonstein, Ellenville, NY (US); Julie C Lonstein, Ellenville, NY (US)

(72) Inventors: Wayne D Lonstein, Ellenville, NY (US); Julie C Lonstein, Ellenville, NY (US)

( * ) Notice: Subject to any disclaimer, the term of this patent is extended or adjusted under 35 U.S.C. 154(b) by 0 days.

(21) Appl. No.: 13/958,510

(22) Filed: Aug. 2, 2013

(65) Prior Publication Data

US 2015/0040148 A1    Feb. 5, 2015

(51) Int. Cl.
| | | |
|---|---|---|
| G06F 3/00 | (2006.01) | |
| G06F 13/00 | (2006.01) | |
| H04N 5/445 | (2011.01) | |
| H04B 7/00 | (2006.01) | |
| H04M 1/66 | (2006.01) | |
| H04M 1/68 | (2006.01) | |
| H04M 3/16 | (2006.01) | |
| H04N 7/167 | (2011.01) | |
| H04N 21/442 | (2011.01) | |
| H04N 21/258 | (2011.01) | |
| H04N 21/414 | (2011.01) | |
| H04N 21/6334 | (2011.01) | |
| H04N 21/643 | (2011.01) | |
| H04N 21/61 | (2011.01) | |

(52) U.S. Cl.
CPC ... *H04N 21/44236* (2013.01); *H04N 21/25816* (2013.01); *H04N 21/25841* (2013.01); *H04N 21/25875* (2013.01); *H04N 21/25883* (2013.01); *H04N 21/41407* (2013.01); *H04N 21/6334* (2013.01); *H04N 21/64322* (2013.01); *H04N 21/6175* (2013.01); *H04N 21/44209* (2013.01)

(58) Field of Classification Search
CPC ............... H04N 21/44222; H04N 21/6582; H04N 7/17318; H04N 21/44236; H04N 21/25816; H04N 21/25841; H04N 21/25875; H04N 21/44209; H04N 21/41407; H04N 21/6334; H04N 21/64322; H04N 21/6175; H04N 21/25883
See application file for complete search history.

(56) References Cited

U.S. PATENT DOCUMENTS

| | | | |
|---|---|---|---|
| 2002/0017977 A1* | 2/2002 | Wall | 340/5.28 |
| 2007/0053513 A1* | 3/2007 | Hoffberg | 380/201 |
| 2008/0247543 A1* | 10/2008 | Mick et al. | 380/201 |
| 2011/0131607 A1* | 6/2011 | Thomas et al. | 725/40 |
| 2012/0196571 A1* | 8/2012 | Grkov et al. | 455/411 |
| 2013/0137376 A1* | 5/2013 | Fitzgerald et al. | 455/41.3 |
| 2013/0227648 A1* | 8/2013 | Ricci | 726/3 |

* cited by examiner

*Primary Examiner* — Jefferey Harold
*Assistant Examiner* — Sean Haiem
(74) *Attorney, Agent, or Firm* — Partners Law Group, Inc; Steve Hassid; Chen Huang (57) ABSTRACT

Methods of detecting and verifying the unauthorized use of media content using a telecommunication reception device which, in one embodiment, comprises interrupting a user's use of or access to media content; informing the user that the interruption can be eliminated after the user verifies his or her information through an electronic device; detecting the user's location based on the user's use of the electronic device; verifying whether user's location is within area where the use of the media content is permitted; verifying whether the user is authorized by the content owner to receive the media content and allowing the user to resume the use of media content once the user passes the verification.

20 Claims, 7 Drawing Sheets

SYSTEMS AND METHODS FOR DETECTING IMPROPER USE OF TELECOMMUNICATIONS RECEPTION DEVICE

FIELD OF THE DISCLOSURE

The present invention generally relates to systems and methods for detecting the improper use of telecommunications reception devices (e.g., place shifting devices) and unauthorized media content. More particularly, the present invention allows media content providers and related entities to detect, verify, prevent or correcting unlawful or improper use of telecommunications reception devices and associated media content.

BACKGROUND

With the popularization of mobile devices, the increase in the internet speed, and the numerous different mobile applications available to the viewing consumer, telecommunications reception devices that transmit content from its originating source to another location or device (e.g., place shifting devices) have become more and more popular. Telecommunications reception devices enable consumers to watch, stream, transfer or recorded live or previously recorded media content on any device with typically an internet connection, anywhere they happen to be. They can watch their live broadcast or recorded program remotely on their computer, tablet, mobile phone or even another TV whenever and wherever they want.

Examples of telecommunications reception devices include but are not limited to Slingbox®, Apple TV®, Roku®, JynxBox® SmartTV XBOX, and Google Chromecast® Dongle. All are small electronic devices that connect to a television—or any other media/content source—and allow the content to be available at another location, often using a network or other known or later developed transmission methods. The user of telecommunications reception device can then see his or her own content, television or otherwise, live and complete with the ability to change channels via a simulated virtual remote, through personal computer, laptop, or mobile phone. One potential legitimate use for using a place shifting devices is to use the services you pay for at your home or business and view certain media content (i.e., sporting events) while out of town, in accordance with the contractual terms set forth by the provider.

However, telecommunications reception devices are often used improperly to steal copyrighted content and/or the use exceeds the user's/owner's licensing terms with the media content provider, which have negative impact on the media content provider and related entities. In certain circumstances, improper use of the telecommunications reception devices could be a crime with serious criminal and civil penalties. U.S. federal statutes have been introduced to try and combat theft of media content, often through theft of programming and satellite television, by imposing civil liability and criminal penalties for improper use of place shifting devices. For example, Section §605 and §553.82 of Chapter 47 of the United States Code prohibit interception and redirection of satellite television signals and the unauthorized reception of programming television signals respectively.

In addition to the improper use of place shifting devices, media content providers are also concerned with the problem of user using their telecommunications reception devices, such as TV or satellite receivers, at unauthorized locations. For example, a user legitimately subscribes to a satellite service from a media content provider at one location, but uses the satellite receiver the user receives from the media content provider at a different location, typically a location with higher subscription fee or where the media content is blacked out. Another example is that a user subscribes for a TV service at one location and applies for additional TV receivers, usually at nominal rate per additional receiver equating to between $5-$8 per unit, but uses the additional TV boxes at different location or gives them to third parties to use, thereby obviating the necessity for that third party to obtain their own subscription and pay subscription fees to the content owner or rights holder(s).

Nonetheless, unlawful or improper use of place shifting devices or telecommunications reception devices continues and grows every day and media content providers often cannot identify who the end users actually are, that have improperly used or continue to use the place shifting devices or telecommunications reception devices. It is also expensive for media content providers to hire private investigators, federal marshal, or auditors, often at hourly rate, to investigate whether media content has been improperly transmitted using place shifting devices or receives by telecommunications reception devices at unauthorized locations. The investigation and collection of evidence of the improper use may also be thwarted by prohibitions on entering residential dwelling places. Moreover, millions of dollars of potential revenue are lost to media content providers whose content is being intercepted and exhibited without any remuneration.

Accordingly, there exists a need for improved system and method which allows electronic media content providers to effectively detect and verify whether a user uses a place shifting device or telecommunications reception device and whether such use is consistent with user's/customer's licensing terms.

SUMMARY OF THE INVENTION

The major objective of the present invention is to provide a method that is capable of detecting and verifying the improper use of media content, often accomplished using place shifting devices or using a telecommunication reception device at unauthorized locations.

Another objective of the present invention is to provide a system that can verify whether a user is using a media content consistent with his or her licensing terms.

Another objective of the present invention is to provide a system that can verify the identify of the end user who is using a telecommunication reception device to receive content that they have not been authorized to receive.

In accordance with one aspect of at least one embodiment of the present invention, the method of detecting improper use of telecommunications reception device comprises 1) interrupting a user's use of or access to a media content, wherein the user accesses the media content through a telecommunications receptive device; 2) informing the user or providing information to a third party to inform the user that the interruption can be eliminated after the user verifies his or her information through an electronic device; 3) detecting the user's location by determining the IP address, triangulation, GPS location or geotag of the electronic device when or after the user verifies his or her information; 4) comparing the location of the user with location of where the telecommunications reception device is authorized to use and 5) determining whether the telecommunications reception device is being used within an authorized location or that the telecommunications reception device is authorized and authentic.

In another aspect of at least one embodiment of the present invention, the system of the present invention comprises 1) a database which stores information about a user; 2) a signal or message that interrupts or negatively effects the user's use of or access to the media content and informs the user that the interruption can be eliminated after the user verified his or her information 3) a processor that receives information from the user to verify the user's information and 4) a means for detecting the user's location when the user verifies his or her information to the information stored in the database regarding that user's one or more accounts.

The foregoing and other objects, features and advantages of the present invention are more readily apparent from the detailed description of the preferred embodiments set forth below, taken in conjunction with the accompanying drawings.

DETAILED DESCRIPTION OF THE INVENTION

The following description is not to be taken in a limiting sense, but is made merely for the purpose of illustrating the general principles of the invention, since the scope of the invention is best defined by the following claims. Various inventive features are described below that can each be used independently of one another or in combination with other features.

Broadly, embodiments of the present invention generally provide method and system for detecting the improper use, viewing or access to media content, often using a place shifting device or a telecommunications reception device at unauthorized location. In one embodiment, the method comprises interrupting a user's use of or access to a media content, wherein the user accesses the media content through a telecommunications receptive device; informing the user or providing information to a third party to inform the user that the interruption can be eliminated after the user verifies his or her information through an electronic device; detecting the user's location by determining the IP address, triangulation, GPS location or geotag of the electronic device when or after the user verifies his or her information; comparing the location of the user with location of where the telecommunications reception device is authorized to use and determining whether the telecommunications reception device is being used within an authorized location or that the telecommunications reception device is authorized and authentic.

In another embodiment, the method further includes informing the user that the user can resume the use of media content if it is determined that the telecommunications reception device is being used within an authorized location and the information provided by the user is authentic.

For purposes of the present disclosure, media content shall include content, in any form and type, that is or can be protected through law or otherwise. The term "media" can refer to both the physical or virtual formats whereas the term "content" can refer to the information or message encoded on to a delivery-medium. Examples of media content include but are not limited to software, video, music, writings, and any other literary, musical, or artistic work presently available or created in the future. The term "telecommunications reception device(s)" refers to any type of telecommunication receivers that is capable of receiving media content. Examples of telecommunications reception devices include but are not limited to TV receivers (i.e., TV boxes), TV tuners, satellite receivers and place shifting devices.

While many devices on the market today are referred to as place shifting devices, there is no authoritative technical definition of what exactly place shifting is. Thus, for purposes of the present disclosure, the term "place shifting device" or "spaceshifting device" shall include, but not limited to, devices which allows a user to view or listen to live, recorded or stored media on a remote device over the Internet or a data network (i.e., place shifting allows users to watch their home TV anywhere). The place shifting device may also allow user to view and control their live TV on device(s) connected to either the user's or a third party's network or from anywhere in the world using a broadband connected PC, mobile device or satellite dish.

Figure 1:
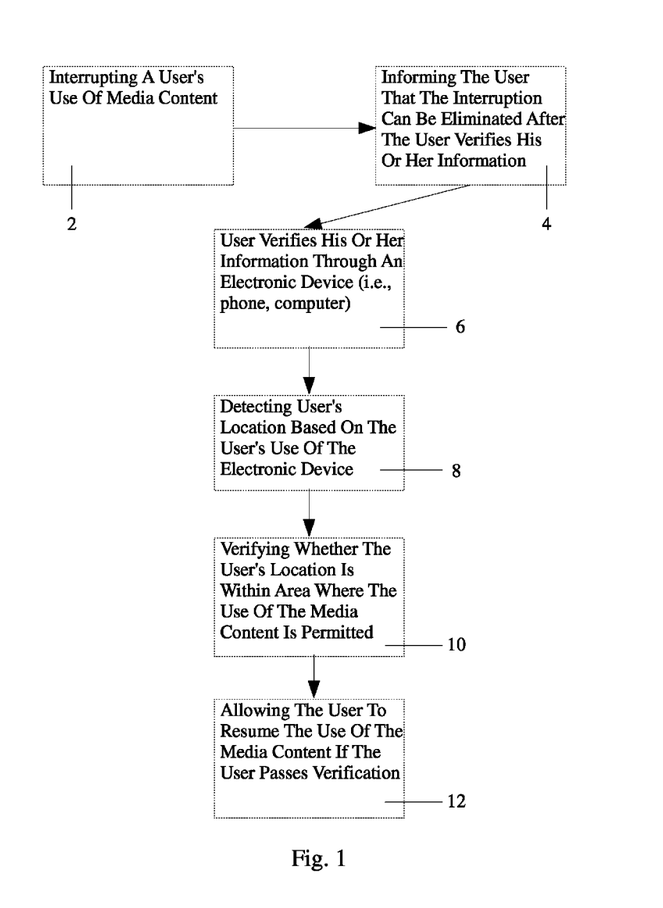
FIG. 1 is a process flow diagram showing an exemplary embodiment of the present invention.

FIG. 1 is a process flow diagram showing an embodiment of the present invention. The present invention discloses a method of detecting and verifying the improper use of media content, often through improper use of a place shifting device or using a telecommunication reception device at unauthorized locations. The method includes, interrupting 2 a user's use of or access to a media content and informing 4 the user that the interruption can be eliminated after the user verifies his or her information.

The interruption 2 can be in various forms. For example and not by way of limitation, the interruption can be a banner, message box or audible message that is displayed somewhere on or in the media content, making the user unable to enjoy the full view or access to the media content. Alternatively, the interruption can simply disable the media content entirely, making the user unable to proceed with the use of the media content. The present invention does not limit itself to the two examples illustrated above. Rather, these two examples merely demonstrate ways of interruptions that can be utilized by the present invention. As long as the interruption affects the user's ability to view, hear or access the media content in any way, it is within the disclosure of the present invention.

Once the user has been interrupted 2, the user will be informed 4 that the interruption can be eliminated after user verifies his or her information. The user can be informed 4 by having a message box, banner or on screen display (OSD) showing on the media content, or any means that is capable of conveying the message to the user of the media content (i.e., audio message). The message conveyed to the user may additionally include information on how to remove the interruption. For example, in one embodiment of the present disclosure, the message includes a website for the user to verify his or her information. In another embodiment of the present disclosure, the message includes a phone number where the user can call and talk to a representative to verify his or her information or the user can do the same with text message. A sample message can be like "To avoid service disruption, please log into http://www.verification.com or text 'verification' from your mobile phone to (310)123-4567 for verification."

After the user has been informed 4, the user can then verify his or her information based on the means or instructions provided with any electronic device 6. For example, if the message includes a website, the user can go to that website to verify his or her information with a smart phone, desktop computer, tablet computer, laptop computer or any electronic device that is capable of browsing the web. If the message includes phone numbers, the user can call or text that number for verification with a phone or mobile phone.

Figure 2:
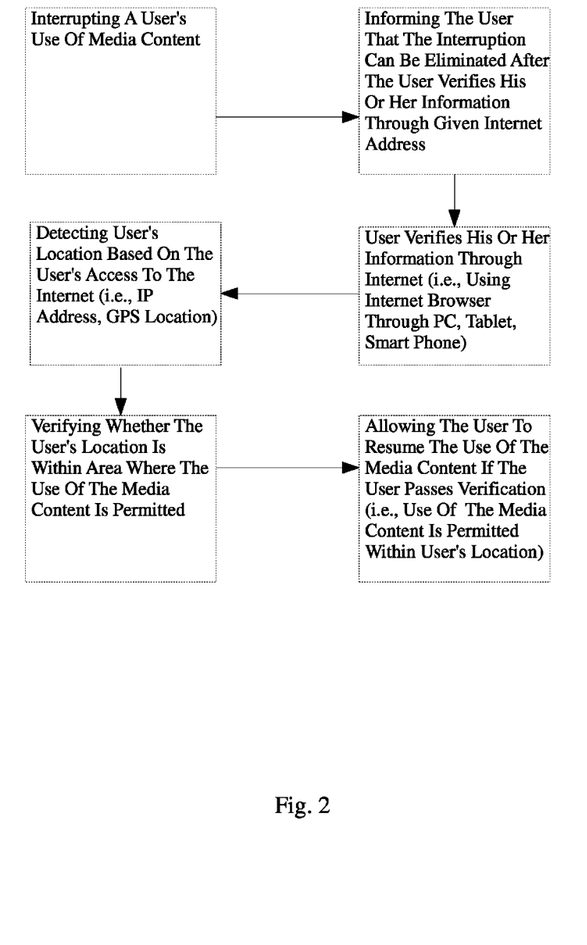
FIG. 2 is a process flow diagram showing an exemplary embodiment of the present invention.

In one embodiment of the present disclosure, as shown by FIG. 2, when a website is provided, the user is prompted to respond to the questions asked in the website. Such question may include requesting name, address, telephone number, best time to call and email address of the users etc. In the instances where the media content is associated with a unique ID (i.e., receiver ID of a TV-box), the user may also be required to provide such unique ID.

Figure 4:
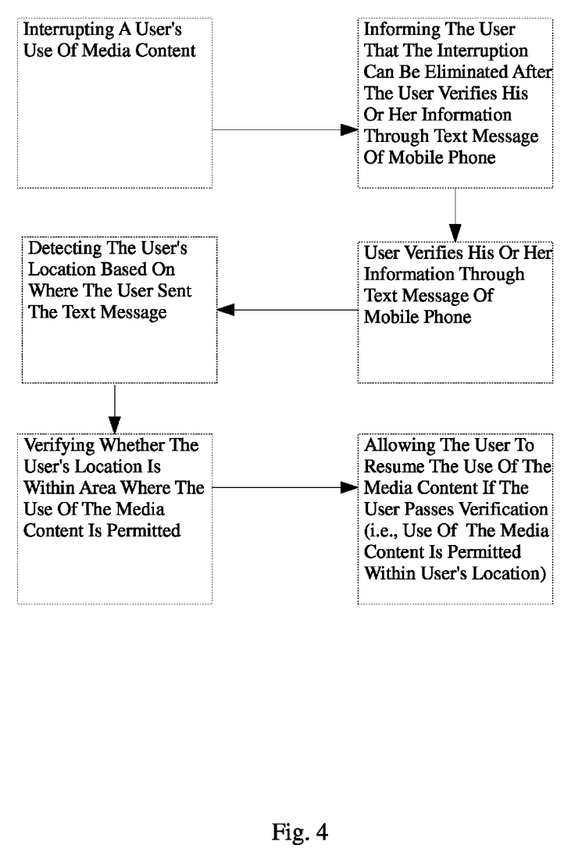
FIG. 4 is a process flow diagram showing an exemplary embodiment of the present invention.

In another embodiment of the present disclosure, as shown in FIG. 4, the user is allowed to verify his or her information with text message. The user may be required to first text a keyword to a given phone number in order to activate the text message verification process. Such keyword can be any keyword predetermined by a text message verification system used. For example, the user may be required to text the word "verify" to the given number in order to proceed with text message verification process. Once the user texts the keyword to the given number, the user will receive response from that given number requesting the user to provide information such as name, address, telephone number, email address or unique ID associated with the media content. The user can then provide the requested information simply by replying the text message. Alternatively, in another embodiment of the present disclosure, a text message asking the user to verify his or her information is automatically delivered to the user after the user's use of the media content has been interrupted.

Referring back to FIG. 1, while the user is providing his or her information as requested, either through a webpage or by text message, the user's location is also being detected 8. This can be done by detecting the IP address, geolocations or GPS locations of the electronic device which the user is using for verification process. For example, if the user is accessing the webpage to verify his or her information, the user's location can be determined by the IP address or GPS position of the electronic device used by the user. If the user is verifying his or her information with text message, user's location can also be determined by triangulating the mobile phone used by the user or any other know or later developed method or system of determining location. The present invention does not limit itself to the two examples illustrated above. Rather, as long as the user's location can be determined based on the electronic device the user is using, it is within the disclosure of the present invention.

Once the user's location is determined, whether the user is using a place shifting device or using a telecommunications reception device at unauthorized locations can be detected by verifying whether the user's location is within area where the use of the media content is permitted 10. As an illustration and not by way of limitation, suppose a person applied for a residential TV-programming service in Santa Monica, Calif. However, during the verification process 6, it is determined that the person is verifying his or her information in Manhattan, N.Y. Then there is a high probability that the person is using a place shifting device or telecommunications reception device which allows him or her to watch his or her California TV-programming shows while in Manhattan, N.Y. On the other hand, if the person's location is determined to be in Santa Monica, Calif., than it is less likely that the person is using a place shifting device.

Additionally, the methods disclosed by the present disclosure can additionally be used to detect whether someone is using their residential programming service in a commercial setting (e.g., at a store or restaurant) where commercial programming service subscription fee would be much higher. For example, if a person subscribes a residential programming service for his or her residence, but the verification process 6 determines that the person is verifying his or her information at a location different from his or her residence, such as in a commercial location, then it is possible that the person is violating his or her terms of service by using their residential programming service commercially.

In yet another embodiment of the present disclosure, if the verification process 6 determines that the user is verifying his or her information at a geographic location where the service provider does not provide service, there is evidence and the presumption that the user is using a placeshifting device or a telecommunications reception device in violation of there terms of service. For example, if the content or service provider does not have an authorized account for the location identified by the user or the methods of this disclosure or the content or service provider does not provide service to that geographic location (in the case of cable or fins) it would be an indication or evidence that unauthorized use and/or dissemination of the content might be occurring.

In addition, the time it takes for the user to verify his or her information is also taken into consideration in determining whether a place shifting device is being used or a telecommunications reception device is being used at unauthorized locations. If the user proceeds with the verification process shortly after the user was informed about the verification and the user is at a location that is impossible to reach within such duration (i.e., reasonable time to travel to the user's location from the permitted use location is greater than the duration), then the chance that the person is using a place shifting device is greatly increased. For example, suppose the person who registered for the California TV-programming service verified his or her information in New York within 3 hours after he or she was informed, it is highly likely that the person is using a place shifting device. On the other hand, if the person verifies his or her information 20 hours after he or she was informed, then there exist a chance that the person may have travelled to New York for whatever purpose and decided to do the verification process there.

Referring back to FIG. 1, if the user passes the verification process 10 (i.e., the user's location is within area where the media content is permitted to use), the user will be allowed to resume the use of the media content 12. The user can optionally be informed by webpage message, text message or OSD on the media content.

Figure 3:
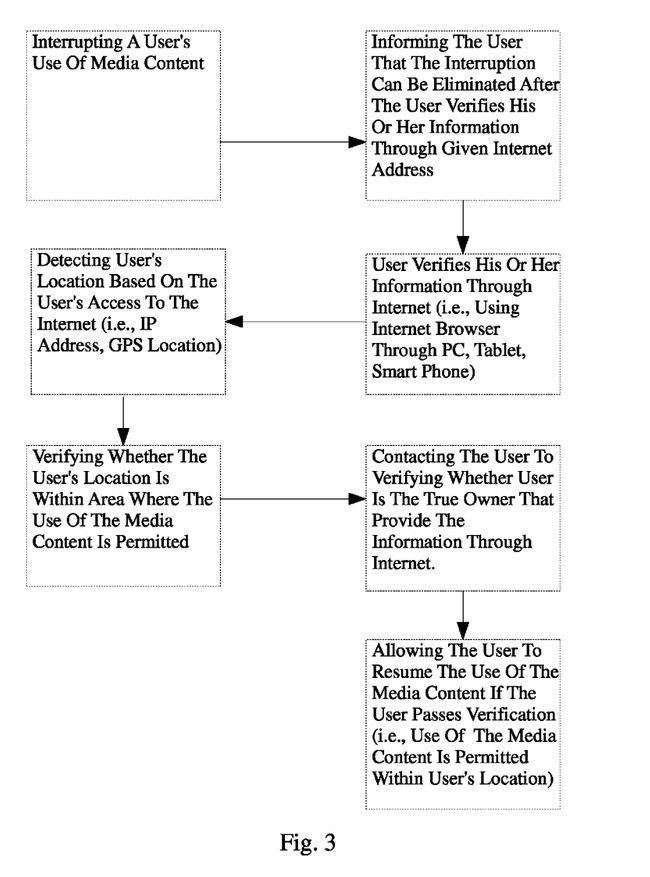
FIG. 3 is a process flow diagram showing an exemplary embodiment of the present invention.
Figure 6:
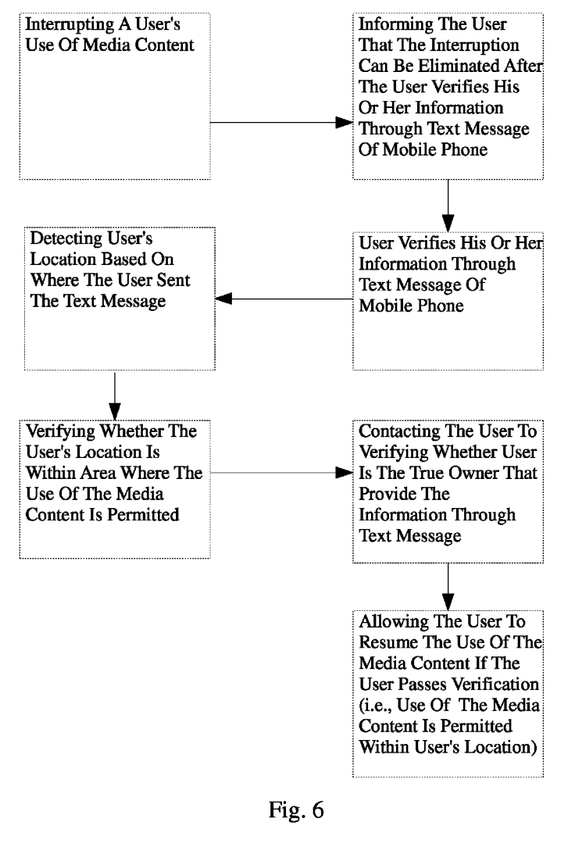
FIG. 6 is a process flow diagram showing an exemplary embodiment of the present invention.

In yet another embodiment of the present invention, as shown in FIG. 3 and FIG. 6, after the user has passed the verification process 10, the user is additionally being contact by personnel associated with the media content provider to verify whether the user is the true owner of the media content or true owner of the information provided. This can be done by asking the user questions that are personal and only known to the user (i.e., registered credit card information, Social Security Number).

Figure 5:
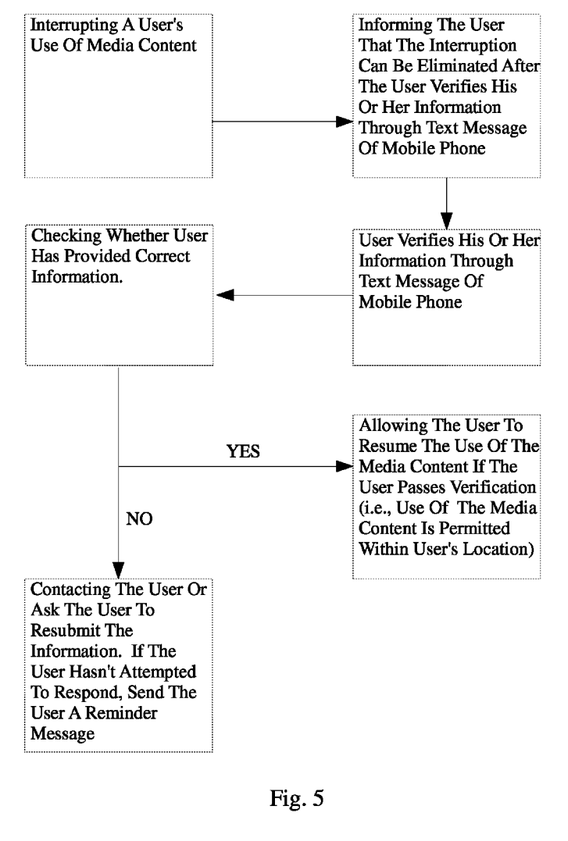
FIG. 5 is a process flow diagram showing an exemplary embodiment of the present invention.

In yet another embodiment of the present invention, as shown in FIG. 5, the detection of user's location is not required. As long as the user provides the correct information (i.e., name, address, birthday and/or correct receiver ID on the user's registered TV-Box), the user passes the verification.

In yet another embodiment of the present invention, if the user has not provided the correct information or has not responded to the verification request within certain period, the user will be reminded to do so. If the user fails to comply with the verification request, the user's use of the media content can optionally be permanently disabled.

In yet another embodiment of the present invention, a live-chat is also provided to the user to assist the user with the verification process.

Figure 7:
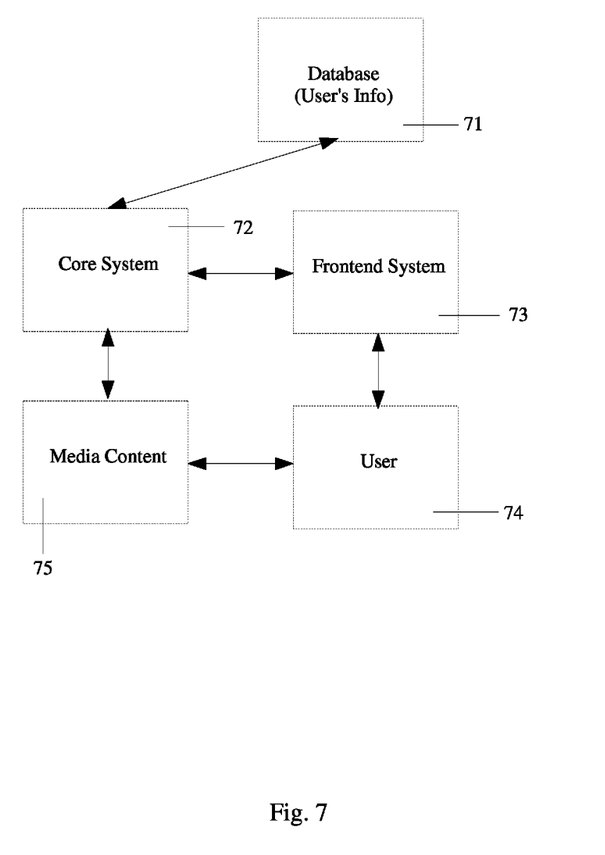
FIG. 7 is a schematic diagram showing an exemplary embodiment of the present invention.

FIG. 7 illustrates a system of detecting and verifying the use of place shifting device in accordance with one aspect of at least one embodiment of the present invention. The system basically provides functions mentioned above (demonstrated by FIG. 1 to FIG. 6) and comprises a database 71, a core system 72, and a frontend system 73. The database 71, core system 72 and frontend system 73 can be realized by using electronic device such as computer. They can exist or be programmed on the same computer, or they can be on different computers individually.

The database 71 stores information about user 74 of media content 75. The information stored can be user's 74 name, address, phone number, credit card information, and/or unique ID associated with the media content 75 used by the user 74. The core system 72 is capable of interrupting the user's 74 use of the media content 75 and informing the user 74 that the interruption can be eliminated after the user 74 verifies his or her information by sending a signal to the user. The interruption can be any way that affects the user's ability to view, hear or access the media content, such as black out or blur the image of the media content.

The frontend system 73 is capable of providing means for the user 74 to submit his or her information to the core system 72 for verification. For example, the frontend system 73 can be a webpage or a text message response system which allows the user 74 to submit his or her information through webpage or text message. The user 74 can access the frontend system 73 with an electronic device such as phone, smart phone, tablet computer, desktop computer or PDA depending on the means provided by the frontend system. The core system 72 basically deals with the provisioning of the frontend system 73 as well as provide the necessary technology to track, analyze, and report data gathered through the frontend system 73.

While the user is accessing the frontend system 73 to verify his or her information, the frontend system 73 will detect the user's 74 location based on the location of the electronic device used by the user. For example, if the user 74 is accessing the frontend system 73 (i.e., a webpage) through internet or with a smart phone to verify his or her information, the user's 74 location can be determined by the IP address, geolocation or GPS position of the electronic device used by the user. If the user 74 is verifying his or her information with text message, user's 74 location can also be determined by triangulating the mobile phone used by the user. Note that the present invention does not limit itself to the two examples illustrated above. Rather, as long as the user's location can be determined based on the electronic device the user is using, it is within the disclosure of the present invention.

Once the user's 74 location is determined, the core system 72 will verify with the database 71 of whether the user 74 is using the media content 75 within the permitted area or without authorization from the content owner. If the user 74 is within the permitted area, it is less likely that the user 74 is using a place shifting device and so the core system 72 can allow the user 74 to resume the use of the media content 75. On the other hand, if the core system 72 determines that a place shifting device is likely used by the user (i.e., the user's location is outside of the permitted area or no authorization from the content owner), the core system may take additional step to verify its determination such as having a personnel to contact the user 74, preferably at his or her home phone number, and see whether anyone has been using the media content 74 at the permitted location.

In yet another aspect of at least one embodiment of the present disclosure, the frontend system 73 of the present invention does not detect the user's 74 location. The core system 72 simply compares the information provided by the user 74 through the frontend system 73 with the user's information in the database 71. If both information matches, the user is considered to have passed the verification and is thereby allowed to resume the use of the media content.

Among other things, the inventions of the present disclosure provide various benefits and advantages. The method and system of the present invention allows the media content owners or providers with a reliable way to detect and verify whether a place shifting device has been used by their customers or unauthorized users. During such process, the person's identity and additional information can also be verified at the same time. In addition, the whole process of the present invention can be programmed and realized by computer systems, thereby effectively reduce the human labor cost (i.e., cost to hire auditors).

It should be understood, of course, that the foregoing relates to exemplary embodiments of the invention and that modifications may be made without departing from the spirit and scope of the invention as set forth in the following claims.

What is claimed is:

1. A method of detecting whether a user is using licensed media content at an authorized location, the method comprising:

without receiving any initial input or information from a user, interrupting the user's use of or access to licensed media content received through a telecommunications receptive device;

informing the user or providing information to a third party to inform the user that the user can resume use of or access to the licensed media content by providing information that verifies the user's identity;

receiving information from the user regarding the user's identity;

determining at least the approximate location of the user using the IP address, triangulation, GPS location or geotag of the device the user is using in providing the information regarding the user's identity;

comparing the at least approximate location of the user with the location where the licensed media content is authorized to be used; and determining whether the licensed media content is being used within an authorized location.

2. The method of claim 1, wherein the user will not have full access to the media content once there is interruption.

3. The method of claim 1, wherein the user is being informed by message displayed on the licensed media content.

4. The method of claim 1, wherein the user verifies the user's identify through a website or with a text message.

5. The method of claim 4, wherein the website will ask the user to provide information consisting of one or more items of information including the user's name, address, phone number, best time to call, email address, receiver ID or option to add additional receiver IDs.

6. The method of claim 1, further comprising informing the user that the user has passed verification and can resume the use of media content if the user is using the licensed media content within an authorized location.

7. The method of claim 1, further comprising:
contacting the user to verify the user's identity.

8. The method of claim 1, wherein the device the user is using in providing the information regarding the user's identity is a phone, smart phone, tablet computer, desktop computer or PDA.

9. The method of claim 1, further comprising:
determining whether a placeshifting device is used.

10. The method of claim 1, wherein the user is pre-authorized to use the licensed media content.

11. A method of detecting and verifying improper use of a licensed media content with placeshifting device, the method comprising:
without receiving any initial input or information from a user, interrupting the user's use of or access to licensed media content received through a telecommunications receptive device;
informing the user that the user can resume use of or access to the licensed media content by providing information requested at a given website or through text message;
determining at least the approximate location of the user using the IP address, triangulation, GPS location or geotag of the device the user is using in accessing the given website or sending the text message;
comparing at least the approximate location of the user with the location of where the licensed media content is authorized to use; and
determining whether a placeshifting device is used to transmit the licensed media content from an authorized location to an unauthorized location.

12. The method of claim 11, wherein the user is informed by displaying a message on the licensed media content.

13. The method of claim 11, wherein the user will be reminded to resend the information requested if the user had provided incorrect information or had not provided any response at all.

14. The method of claim 11, wherein the given website asks the user to provide name, address, phone number, email address and ID associated with the licensed media content.

15. A system for detecting and verifying improper use of licensed media content with placeshifting device, the system comprising:
a database which stores personal and licensing information about a user with regards to licensed media content;
a computer or processor that sends a signal which interrupts the user's use of or access to the licensed media content without receiving any initial input or information from the user and informs the user that the user can resume use of or access to the licensed media content by providing information that verifies the user's identity;
a computer or processor which receives information from the user and determines at least the approximate location of the user using the IP address, triangulation, GPS location or geotag of the device the user is using in providing the information regarding the user's identity; and
a computer or processor that determines whether a placeshifting device is used to transmit the licensed media content from an authorized location to an unauthorized location by comparing at least the user's approximate location with the location of where the licensed media content is authorized to use.

16. The system of claim 15, wherein the database stores information such as unique ID that is associated with the media content.

17. The system of claim 15, wherein the computer or processor that informs the user that the user can resume use of or access to the licensed media content by providing information that verifies the user's identity will provides the user with a given website, an address or phone number to submit text message or a phone number to contact customer service.

18. The system of claim 15, wherein the computer will inform the user that the user can resume the use of the media content when it determines that the information provided by the user is consistent with the information stored in the database and that the user's location is within area where the media content is permitted to use.

19. The system of claim 15, wherein the computer or processor directs the user to verify the user's identity with a live representative.

20. The system of claim 15, wherein the user verifies the user's identity by a phone, smart phone, tablet computer, desktop computer or PDA.

\* \* \* \* \*